United States Patent
Hori (10) Patent No.: US 7,033,031 B2
(45) Date of Patent: Apr. 25, 2006

(54) OPTICAL SYSTEM AND PROJECTION TYPE IMAGE DISPLAY APPARATUS EQUIPPED WITH OPTICAL SYSTEM

(75) Inventor: Hidehiko Hori, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/721,337

(22) Filed: Nov. 26, 2003

(65) Prior Publication Data

US 2004/0184012 A1 Sep. 23, 2004

(30) Foreign Application Priority Data

Mar. 19, 2003 (JP) .............................. 2003-075394

(51) Int. Cl.
 G03B 21/28 (2006.01)
 G03B 21/14 (2006.01)
 G02B 6/00 (2006.01)
 F21V 7/00 (2006.01)
 H04N 5/74 (2006.01)

(52) U.S. Cl. ................. 353/99; 353/37; 353/97; 353/102; 362/341; 362/551; 385/34; 348/759

(58) Field of Classification Search ............ 353/99, 353/98, 31, 30, 34, 37, 38, 97, 102; 385/34, 385/901; 359/15, 16, 456, 589, 599, 618, 359/629, 638, 34; 362/26, 27, 31, 327, 331, 362/551, 341; 349/5, 8, 61, 64, 65, 67, 70, 349/104, 112, 113, 116; 358/296; 351/201, 351/232, 240; 430/7; 348/759
See application file for complete search history.

(56) References Cited

U.S. PATENT DOCUMENTS

| | | | |
|---|---|---|---|
| 5,634,704 A * | 6/1997 | Shikama et al. | 353/31 |
| 5,748,376 A * | 5/1998 | Lin et al. | 359/629 |
| 5,800,033 A * | 9/1998 | Funanami et al. | 353/97 |
| 6,578,968 B1 * | 6/2003 | Bierhuizen et al. | 353/30 |
| 6,657,725 B1 * | 12/2003 | Takahashi | 356/400 |
| 6,698,891 B1 * | 3/2004 | Kato | 353/20 |
| 2001/0008470 A1 * | 7/2001 | Dewald | 359/850 |
| 2002/0118344 A1 * | 8/2002 | Fischer et al. | 353/97 |
| 2004/0057017 A1 * | 3/2004 | Childers et al. | 353/31 |

FOREIGN PATENT DOCUMENTS

| | | | |
|---|---|---|---|
| JP | 07-281293 | * | 10/1995 |
| JP | 2000-098272 A | | 4/2000 |
| JP | 2001-183603 A | | 7/2001 |

* cited by examiner

Primary Examiner—W. B. Perkey
Assistant Examiner—Rochelle Blackman
(74) Attorney, Agent, or Firm—Birch Stewart Kolasch & Birch LLP (57) ABSTRACT

A light guiding member (40) for reflecting therein light entering through a light entering surface (40a) several times to cause light having a uniform illumination distribution to outgo from a light outgoing surface (40b) is inserted into an optical path between a lamp source (10) and a reflection type display device (80). The light outgoing surface (40b) of the light guiding member (40) is formed in a dissimilar shape with an image display region of the reflection type display device (80), and a region irradiated with light in the image display region of the reflection type display device (80) is formed smaller than the image display region. This prevents a whitening phenomenon in a projected image undisplay region and improves video effects given to viewers as well as effectively utilizing light emitted from a light source for images to be projected to display projected images brightly.

22 Claims, 8 Drawing Sheets

OPTICAL SYSTEM AND PROJECTION TYPE IMAGE DISPLAY APPARATUS EQUIPPED WITH OPTICAL SYSTEM

This nonprovisional application claims priority under 35 U.S.C. § 119(a) on Patent Application No. 2003-075394 filed in JAPAN on Mar. 19, 2003, the entire contents of which are hereby incorporated by reference.

BACKGROUND OF THE INVENTION

1. Field of the Invention

The present invention relates to an optical system and a projection type image display apparatus configured to guide light emitted from a lamp source to an image display region of a reflection type display device along a predetermined optical path, to reflect a light component which forms an image to be projected by the image display region, and to project the reflected light component onto a predetermined screen.

2. Description of the Background Art

A conventional reflection type image display apparatus is known in which light emitted from a lamp source is guided to an image display region of a reflection type display device along a predetermined optical path, and a light component which forms an image to be projected is reflected by the image display region, and the reflected light component is projected onto a predetermined screen (e.g., Japanese Patent Application Laid-Open No. 2000-98272 and 2001-183603).

In this type of apparatus, light emitted from a light source is converted into light having a substantially uniform illumination distribution by a rod lens or the like, and the converted light is guided to the reflection type display device, and light which forms an image reflected by the image display region of the reflection type display device is projected onto the screen.

In such projection type image display apparatus, a light outgoing surface of an optical member such as a rod lens for converting light into the state that illumination distribution is substantially uniform generally has a conjugate relationship with an image display region of a reflection type display device. Thus, the light outgoing surface of the optical member and the image display region of the reflection type display device are formed in a substantially similar shape.

Further, since an image reflected by the reflection type display device is scaled up or down to be projected onto the screen, the image display region of the reflection type display device and the projected image on the screen are in a similar shape.

Therefore, when an image having an aspect ratio (the ratio between the width and height of an image) of 4:3 is to be projected, the light outgoing surface of the optical member, the image display region of the reflection type display device and the screen size are all configured to have an aspect ratio of 4:3.

In the case that an image having an aspect ratio of 16:9 is projected with such apparatus, the optical member transmits light for irradiating the whole area of the image display region of the reflection type display device while the reflection type display device is controlled so as to perform image formation only in the central portion of the image display region and to prevent light entering the other portion from being reflected toward the screen.

In this case, however, part of light is also reflected by a portion other than the central portion of the image display region, and the reflected light is projected onto the screen. This causes a problem in that, although top and bottom regions of a image projection region on the screen where images are inherently unnecessary to be displayed need to be displayed in black, a part or the whole of the top and bottom regions is displayed brightly, that is, displayed in white (hereinafter referred to as a "whitening phenomenon"). Such whitened region appears in the vicinity of a projected image, causing another problem in that, particularly in the application to a video projector and in viewing video in a dimly lit room in order to enhance a realistic sensation of video, such region interferes with viewing and reduces the realistic sensation. Also, in the application to a data projector used for presentation or the like, viewers cannot concentrate on a projected image, causing the effect of presentation to be degraded.

Further, light outgoing from the light outgoing surface of the optical member is irradiated onto the whole area of the image display region of the reflection type display device, which means light incident upon a portion other than the central portion of the image display region is not utilized effectively. This disadvantageously causes images projected onto the screen to be darkened.

Due to these factors, a conventional projection type image display apparatus cannot display images having an aspect ratio of 16:9 in good condition.

SUMMARY OF THE INVENTION

An object of the present invention is to provide an optical system and a projection type image display apparatus capable of preventing the whitening phenomenon and improving video effects given to viewers as well as effectively utilizing light emitted from a light source for an image to be projected to display a projected image brightly.

According to a first aspect of the present invention, the optical system is configured to guide light emitted from a lamp source to an image display region of a reflection type display device along a predetermined optical path, to reflect a light component for forming an image to be projected by the image display region of the reflection type display device, and to project a reflected light component onto a predetermined screen. In the optical system, a light guiding member for reflecting therein light entering through a light entering surface several times to cause light having a uniform illumination distribution to outgo from a light outgoing surface is inserted into an optical path between the lamp source and the reflection type display device, and the light outgoing surface of the light guiding member is formed in a dissimilar shape with the image display region of the reflection type display device, and a region irradiated with light in the image display region is smaller than the image display region.

The optical system is configured such that the light outgoing surface of the light guiding member is in a dissimilar shape with the image display region of the reflection type display device and a region irradiated with light in the image display region is smaller than the image display region, which prevents the whitening phenomenon and improves video effects given to viewers as well as effectively utilizing light emitted from a light source for images to be projected to display projected images brightly.

According to a second aspect of the invention, the projection type image display apparatus is configured to guide light emitted from a lamp source to an image display region of a reflection type display device along a predetermined optical path, to reflect a light component for forming an image to be projected by the image display region of the reflection type display device, and to project a reflected light component onto a predetermined screen. In the projection type image display apparatus, a light guiding member for reflecting therein light entering through a light entering surface several times to cause light having a uniform illumination distribution to outgo from a light outgoing surface is inserted into an optical path between the lamp source and the reflection type display device, and the light outgoing surface of the light guiding member is formed in a dissimilar shape with the image display region of the reflection type display device, and a region irradiated with light in the image display region is smaller than the image display region.

The projection type image display apparatus is configured such that the light outgoing surface of the light guiding member is in a dissimilar shape with the image display region of the reflection type display device and a region irradiated with light in the image display region is smaller than the image display region, which prevents the whitening phenomenon and improves video effects given to viewers as well as effectively utilizing light emitted from a light source for images to be projected to display projected images brightly.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
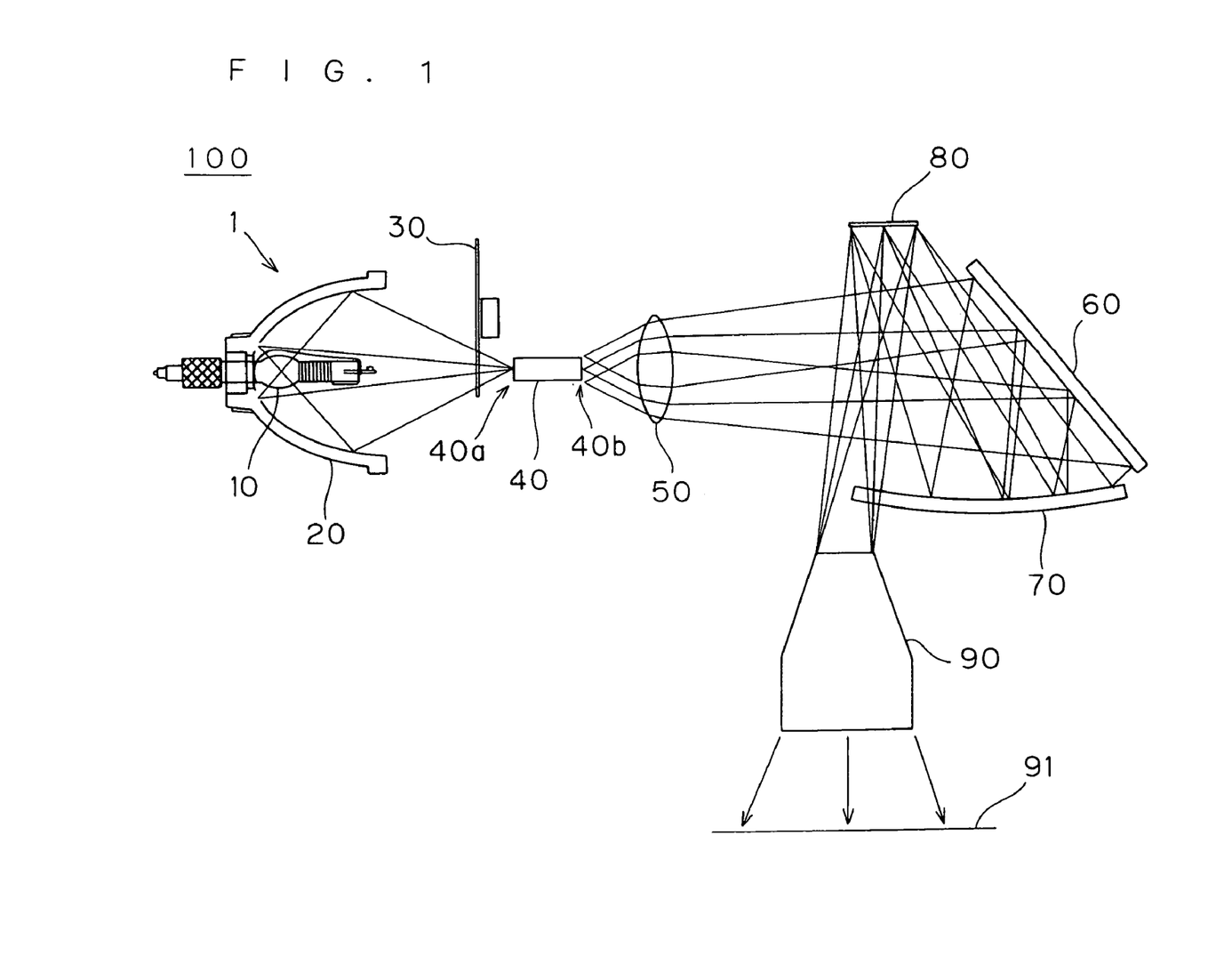
FIG. 1 illustrates the configuration of an optical system in a projection type image display apparatus according to the present invention.

FIG. 1 illustrates the configuration of a projection type image display apparatus 100, and more particularly, an optical system 1 which is an essential part thereof. This optical system 1 is configured such that light emitted from a lamp source 10 follows an optical path passing through a lamp reflector 20, a color wheel 30, a light guiding member 40, a relay lens 50, a plane reflection mirror 60, a concave mirror 70, a reflection type display device 80 and a projection lens 90 to be projected onto a screen 91.

The lamp source 10 is a light source formed by a high pressure mercury lamp utilizing discharge or a halogen lamp, and light emitted from the lamp source 10 is reflected by the lamp reflector 20 provided to surround the lamp source 10. The lamp reflector 20 has a spheroidal surface that faces the lamp source 10 and is mirror-finished. The lamp source 10 is provided at one of the focal points of the spheroidal surface, and light emitted from the lamp source 10 is reflected by the inner surface of the lamp reflector 20 to be condensed toward the other focal point.

At the other focal point, a light entering surface 40a of the light guiding member 40 is placed. The light guiding member 40 is configured to reflect therein light entering through the light entering surface 40a several times so that light having a uniform illumination distribution outgoes from a light outgoing surface 40b.

Figure 2:
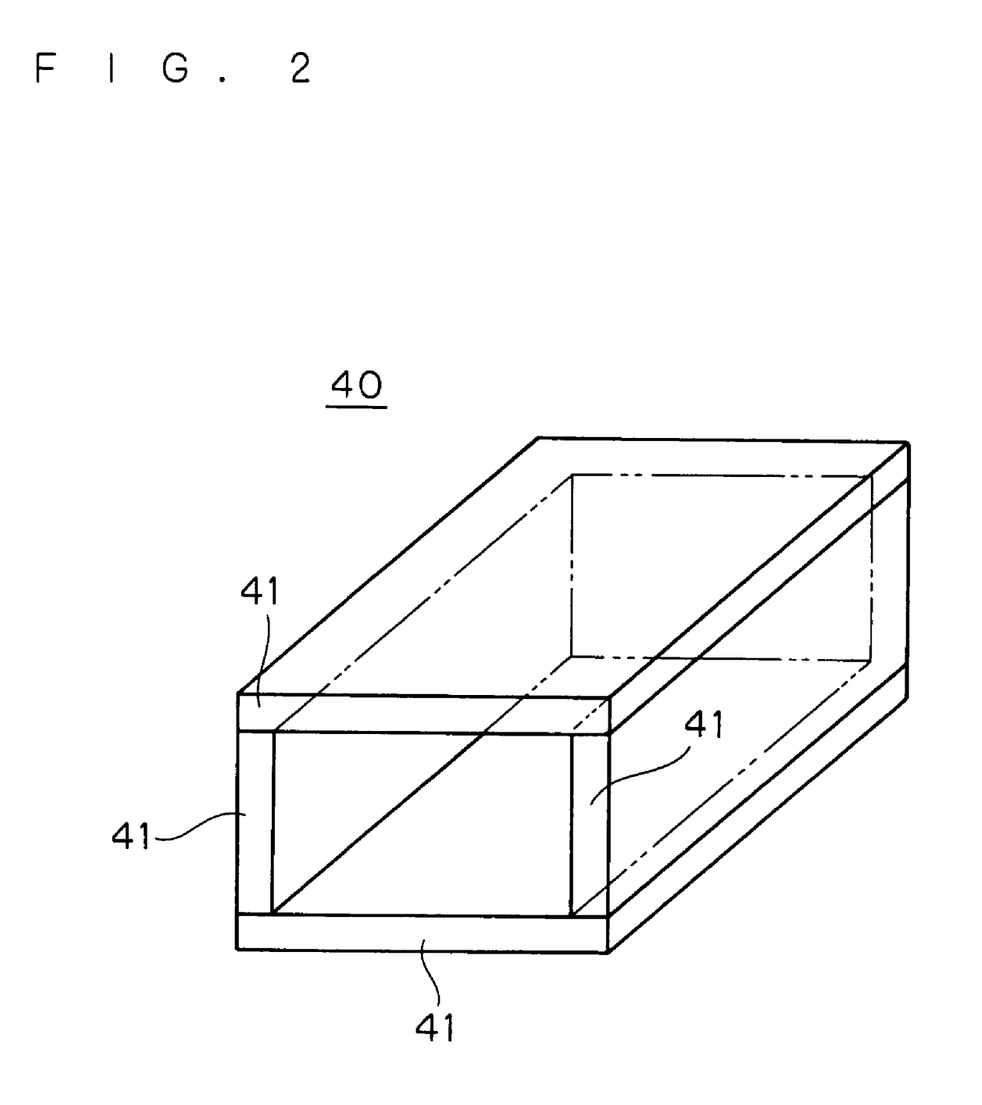
FIG. 2 illustrates an example of a light guiding member.

FIG. 2 illustrates an example of the light guiding member 40. In the present embodiment, the light guiding member 40 is formed by a plurality of plate-like glass members 41 each having one side surface being mirror-finished. The glass members 41 are assembled such that the respective mirror surfaces face a hollow space to form a rectangular tube as a whole. Such light guiding member is generally called a light pipe.

Figure 3:
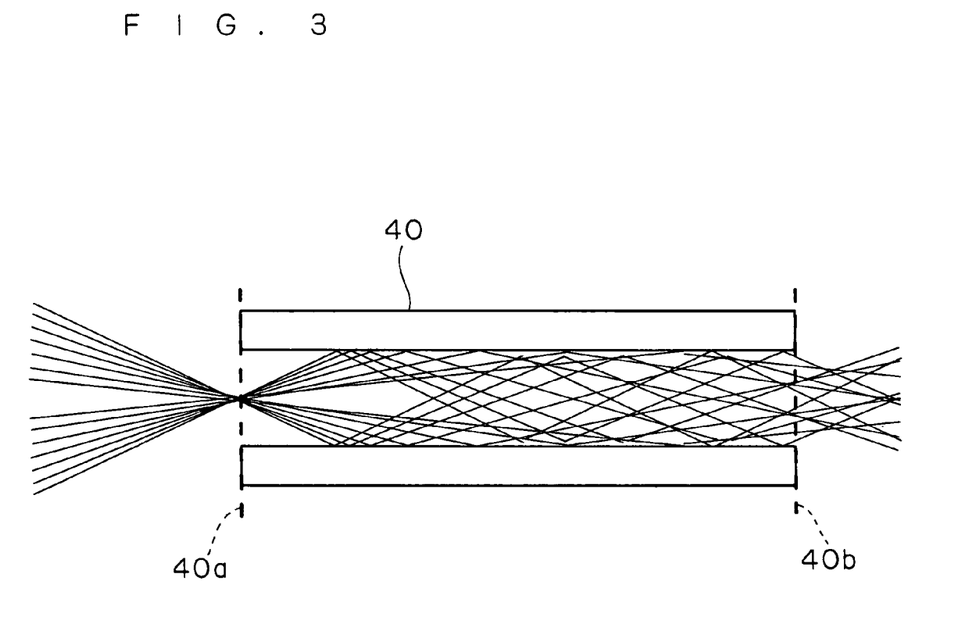
FIG. 3 conceptually illustrates light rays in the light guiding member.

FIG. 3 conceptually illustrates light rays in the light guiding member 40. The light guiding member 40 configured as described above is capable of reflecting light entering the inner hollow space through the light entering surface 40a several times by the inner surfaces, thereby converting light outgoing from the light outgoing surface 40b to have a uniform illumination distribution in section of luminous flux. The light guiding member 40 is arranged such that the light entering surface 40a is provided at the focal point of the lamp reflector 20 with the center of opening on the light entering surface 40a substantially matching the optical axis of condensed light so that light emitted from the lamp source 10 is effectively taken in and is transmitted to the post-stage optical system.

Figure 4:
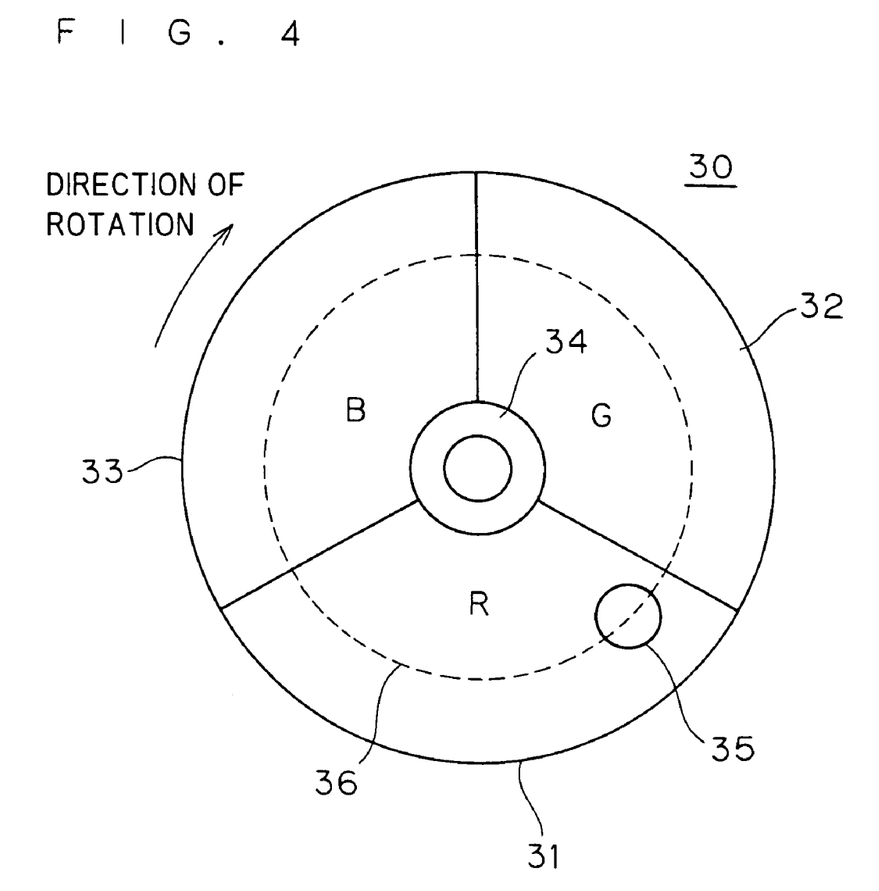
FIG. 4 illustrates a color wheel viewed from a lamp source.

Provided between the lamp reflector 20 and light guiding member 40 is the color wheel 30 having the function of time-dividedly changing the color of passing light. FIG. 4 illustrates the color wheel 30 viewed from the lamp source 10. As shown in FIG. 4, the color wheel 30 has a disk-shaped rotating part divided into, for example, three parts, on which color filters 31, 32 and 33 for red (R), green (G) and blue (B), respectively, are provided and a motor 34 located at the center of each of the color filters 31 to 33 rotating in a single direction with a uniform speed, following which the color filters 31 to 33 also rotate.

Such color wheel 30 is inserted into an optical path between the lamp reflector 20 and light guiding member 40 and is arranged such that light condensed by the lamp reflector 20 always passes through a predetermined position 35. Accordingly, as the motor 34 rotates, the respective color filters 31 to 33 sequentially pass through the position 35, whereby a trajectory 36 is drawn on the color wheel 30. With such operation, RGB lights are transmitted from the color wheel 30 to the post-stage optical system while being changed in sequence at regular time intervals.

On the other hand, light of a uniform illumination distribution outgoing from the light guiding member 40 passes through the relay lens 50 and is thereafter reflected by the reflection mirror 60 to enter the concave mirror 70. The concave mirror 70 has both the reflecting function and condensing function and is configured to reflect all incident beams reflected by the reflection mirror 60 so as to condense the beams and to guide reflected light to the reflection type display device 80.

The reflection type display device 80 modulates light entering from the concave mirror 70 on the basis of an image signal input to the projection type image display apparatus 100, thereby forming a light figure constituting an image component to be projected. Examples of such reflection type display device 80 are a reflection type liquid crystal panel, a device having micromirrors arrayed two-dimensionally, each being capable of selectively switching the direction in which light is reflected, and a device having a great number of reflection mirrors which differ in height to cause interference with one another, thereby controlling the direction in which light is reflected.

Figure 5:
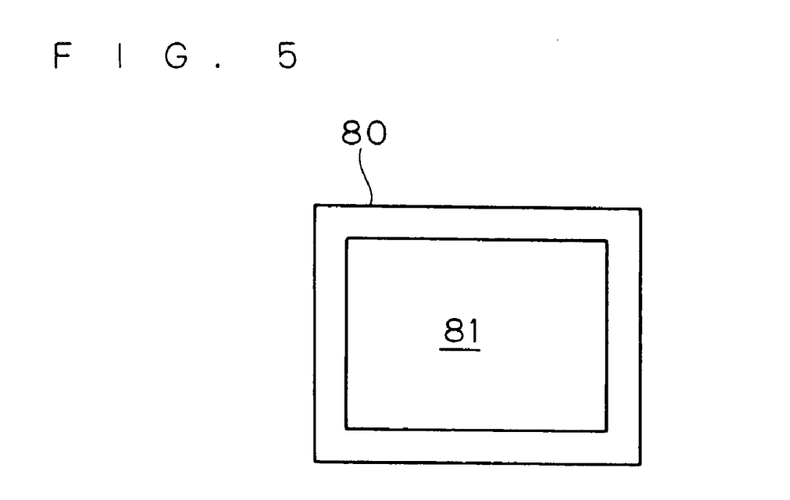
FIG. 5 illustrates a reflection type display device viewed from an image display surface.

FIG. 5 illustrates the reflection type display device 80 viewed from the front (i.e., from an image display surface). As shown in FIG. 5, an image display region 81 for reflecting light from the concave mirror 70 to reflect a light figure constituting an image component to be projected is provided on the image display surface of the reflection type display device 80. On the image display region 81, the above-mentioned liquid crystal panel or micromirrors are provided and configured such that image formation is carried out on the basis of an input image signal.

A conventional well-known device may be used as the reflection type display device 80, and the image display region 81 is formed to have an aspect ratio of 4:3, for example.

Light reflected by the image display region 81 is projected onto the screen 91 through the projection lens 90.

By the action of the color wheel 30, RGB lights are time-divided and sequentially enter the image display region 81 of the reflection type display device 80, while, in synchronization with the color components passing through the color wheel 30, image signals corresponding to the respective color components are input to the reflection type display device 80. With such operation, images of the respective RGB colors are sequentially projected onto the screen 91. By sufficiently shortening the color changing period, images of the respective colors are seen in combination, which allows full-color video to be perceived as a whole.

Then, in the present embodiment, the light outgoing surface 40b of the light guiding member 40 (more strictly, an opening on the light outgoing surface 40b) in the optical system 1 of the above configuration is formed to be in conformity with an aspect ratio of an image to be projected. For instance, in the case where an image having an aspect ratio of 16:9 is to be projected, the light outgoing surface 40b of the light guiding member 40 is also formed to have an aspect ratio of 16:9. Therefore, the light outgoing surface 40b is formed in a dissimilar shape with the image display region 81 of the reflection type display device 80.

Then, optical devices (relay lens 50, reflection mirror 60 and concave mirror 70) between the light guiding member 40 and reflection type display device 80 causes light outgoing from the light guiding member 40 to be irradiated onto a part of the image display region 81 in the reflection type display device 80 which is smaller than the image display region 81.

Figure 6:
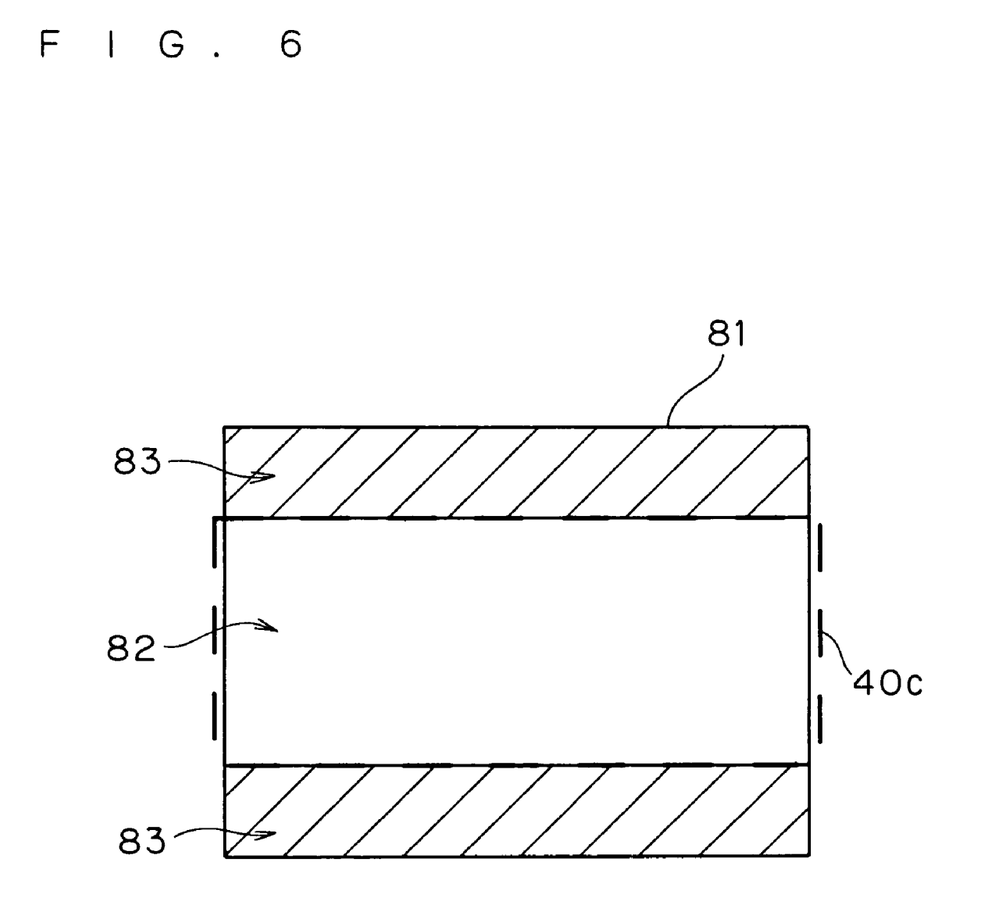
FIG. 6 illustrates where light is irradiated in an image display region.

FIG. 6 illustrates where light is irradiated onto the image display region 81 in the reflection type display device 80. A broken line region 40c in FIG. 6 indicates a range in which the light outgoing surface 40b of the light guiding member 40 is projected onto the image display region 81 by the optical devices provided between the light guiding member 40 and reflection type display device 80. Thus, as shown in FIG. 6, light outgoing from the light outgoing surface 40b of the light guiding member 40 is condensed and irradiated by the optical devices only onto a region 82 at substantially the center of the image display region 81. This region 82 has a substantially similar shape with the light outgoing surface 40b of the light guiding member 40. Thus, other regions 83 (hatched regions in FIG. 6) in the image display region 81 are not irradiated with light.

The reflection type display device 80 then performs image formation on the basis of an image signal only in the central region 82 which is a light irradiated region, while image formation is not performed in the other regions 83 which are not irradiated with light. For instance, though the image display region 81 is formed to have an aspect ratio of 4:3, an image having an aspect ratio of 16:9 is formed only using the central region 82. Then, all light components passing through the light guiding member 40 are effectively utilized as light for forming an image to be projected. An image brighter than in a conventional apparatus is then projected onto the screen 91.

Figure 7:
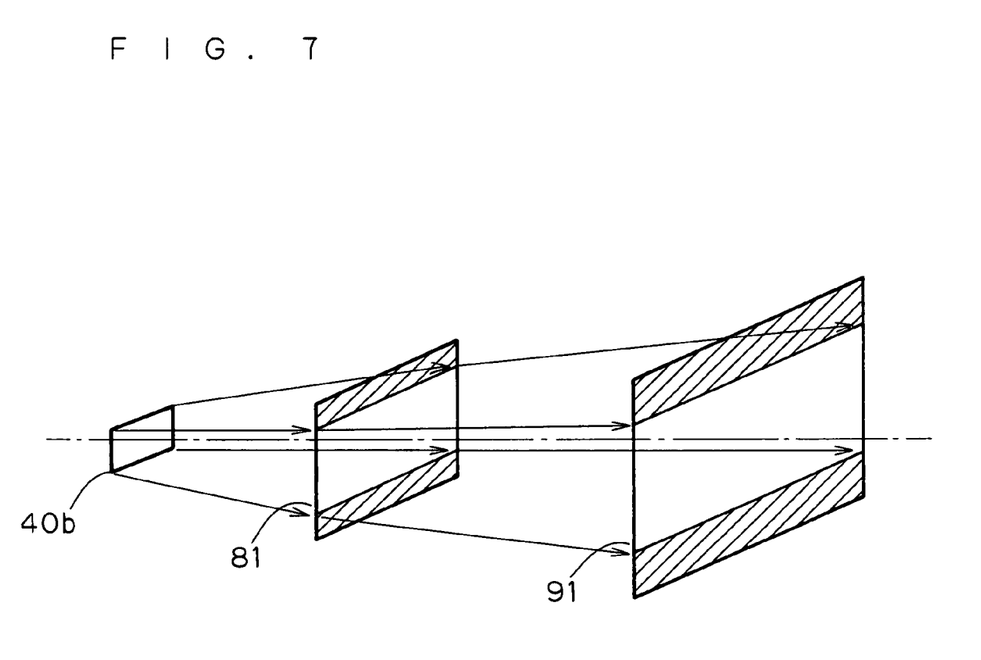
FIG. 7 is a schematic view simply illustrating how light is transmitted.

FIG. 7 is a schematic view simply illustrating how light is transmitted through the light guiding member 40 and reflection type display device 80 to the screen 91. As shown in FIG. 7, according to the above-described optical system 1, light outgoing from the light outgoing surface 40b of the light guiding member 40 formed in conformity with the shape of an image to be projected is irradiated only onto a partial region (the central region) of the image display region 81 of the reflection type display device 80. Then, light for forming an image to be projected is generated in the light irradiated region and is projected onto the screen 91.

Therefore, light is irradiated only onto an image forming region in the reflection type display device 80, not onto the other regions (regions 83 in FIG. 6). This prevents unnecessary reflection in the region not irradiated with light and avoids the possibility that unnecessarily reflected light is projected onto regions adjacent to the image projection region on the screen 91. As a result, the whitening phenomenon does not occur in the projected image undisplay region on the screen 91, which allows video effects given to viewers to be improved.

As described, the optical system 1 according to the present embodiment is configured such that the light outgoing surface 40b of the light guiding member 40 is formed in conformity with a projected image on the screen 91 and formed in a dissimilar shape with the image display region 81 of the reflection type display device 80 and such that the irradiation range of light irradiated onto the reflection type display device 80 through the light guiding member 40 is smaller than the image display region 81. This allows all light outgoing from the light guiding member 40 to contribute to formation of an image to be projected, enabling projection of an image brighter than in a conventional apparatus. Further, the whitening phenomenon dose not occur in the projected image undisplay region on the screen 91, which allows video effects given to viewers to be improved. Particularly, in the application to a video projector and in viewing video in a dimly lit room in order to enhance the realistic sensation of video, high-quality image projection can be achieved without loss of realistic sensation. Also, in the application to a data projector, viewers can concentrate on observing projected images, which allows more effective presentation to be achieved.

Therefore, even when a well-known device having an aspect ratio of 4:3 is used as the reflection type display device 80, images having an aspect ratio of 16:9 can be projected onto the screen 91 in good condition.

Further, the use of the above-described optical system 1 to construct the projection type image display apparatus 100 allows the projection type image display apparatus 100 to provide the same effects as described above.

In the present embodiment, the light guiding member 40 is not limited to the above-described rectangular light pipe, but may be a conventionally used rod lens or the like.

Second Preferred Embodiment

In a second preferred embodiment, description will be directed to an improvement in the case of using the light guiding member 40 as shown in FIG. 2. More specifically, an example of the light guiding member 40 configured as the so-called light pipe will be described in which light passing outside the mirror surfaces that face the hollow space for guiding light is interrupted. In the present embodiment, the overall configuration of the projection type image display apparatus 100 and optical system 1 is the same as that described above, repeated explanation of which is thus omitted here.

Figure 8:
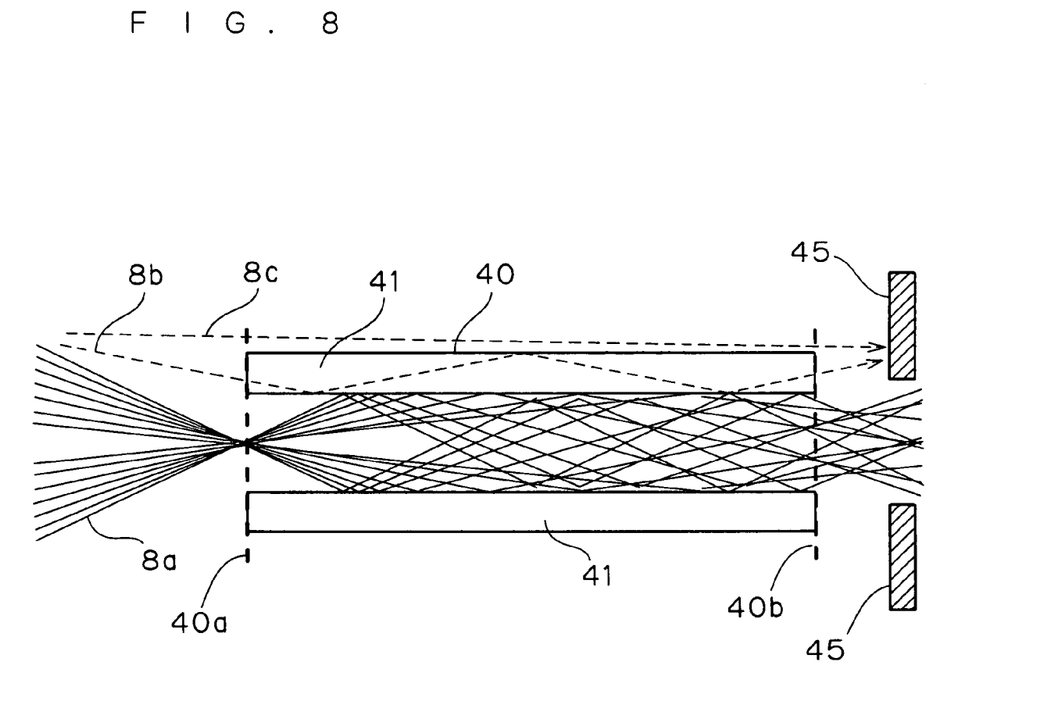
FIG. 8 illustrates an exemplary configuration of a light guiding member and a light shielding member.

FIG. 8 illustrates the light guiding member 40 and a light shielding member 45 inserted into the optical path between the lamp source 10 and reflection type display device 80. The light guiding member 40 shown in FIG. 8 is the same as that described in the first preferred embodiment, and functions as a light pipe having a hollow space for guiding light formed by the plurality of glass members 41.

By the action of the lamp source 10 and lamp reflector 20, light rays 8a, most part of light guided to the light guiding member 40 is condensed at the focal point of the lamp reflector 20 and is directed to the inner hollow space through the opening on the light entering surface 40a. Being repeatedly reflected in the inner hollow space of the light guiding member 40 several times, the light rays 8a are made uniform in illumination distribution and outgo through the opening on the light outgoing surface 40b.

However, the light guided to the light guiding member 40 from the lamp source 10 and lamp reflector 20 contains light rays such as light rays 8b and 8c shown in FIG. 8 which do not enter the inner hollow space through the opening on the light entering surface 40a. For instance, the light ray 8b enters the glass members 41 constituting the light guiding member 40 through end faces of the glass members 41 and is repeatedly reflected several times by the inner surfaces of the glass members 41, following which outgoes from the end faces on the light outgoing side to be transmitted to the post-stage optical system. The light ray 8c does not enter the glass members 41 but is transmitted outside the light guiding member 40 to enter the post-stage optical system. These light rays 8b and 8c are not made uniform in illumination distribution by the light guiding member 40 but follow an optical path that cannot be expected in optical design, which are thus unnecessary lights for forming an image to be projected.

Therefore, in the present embodiment, the light shielding member 45 is provided in the path of light outgoing from the light guiding member 40 as shown in FIG. 8. The light shielding member 45 is for transmitting the light rays 8a outgoing through the opening on the light outgoing surface 40b and shielding the unnecessary light rays 8b and 8c. Used as the light shielding member 45 is, for example, a light shielding plate having at its center an opening of substantially the same shape of that of the light outgoing surface 40b. The light shielding plate is formed to have an outside shape greater than a sectional outside shape of the light guiding member 40 in order to shield the unnecessary light ray 8c. The light shielding member 45 is provided with the center of opening substantially matching the optical axis, so that the unnecessary light rays 8b and 8c passing outside the reflection surfaces that face the hollow space of the light guiding member 40 are both well shielded and are prevented from entering the post-stage optical system.

Although FIG. 8 illustrates the case in which the light shielding member 45 is provided on the light outgoing side of the light guiding member 40, the light shielding member 45 may be provided on the light entering side or both on the light entering side and light outgoing side.

As described, in the present embodiment, the light shielding member 45 can shield the unnecessary light rays 8b and 8c passing outside the reflection surfaces that face the hollow space of the light guiding member 40, which can prevent the unnecessary light rays 8b and 8c from reaching the reflection type display device 80. This can prevent the unnecessary light rays 8b and 8c from being reflected by the reflection type display device 80 to be projected onto the screen 91 which causes irregular luminance and whitening phenomenon. That is, the configuration described in the present embodiment can even prevent the whitening phenomenon caused by the unnecessary light rays 8b and 8c, allowing video effects given to viewers to be further improved.

Further, in the present embodiment, the light shielding plate as the light shielding member 45 is provided independently of the light guiding member 40 at least on one of the light entering side and light outgoing side of the light guiding member 40. Thus, adjusting the light shielding member 45 alone allows the unnecessary light rays 8b and 8c to be shielded well. That is, the light guiding member 40 is strictly positioned in connection with the other optical devices, but can be adjusted into such a condition that the unnecessary light rays 8b and 8c are shielded well, irrespective of the other optical devices, since the light shielding member 45 is provided independently of the light guiding member 40.

Third Preferred Embodiment

Figure 9:
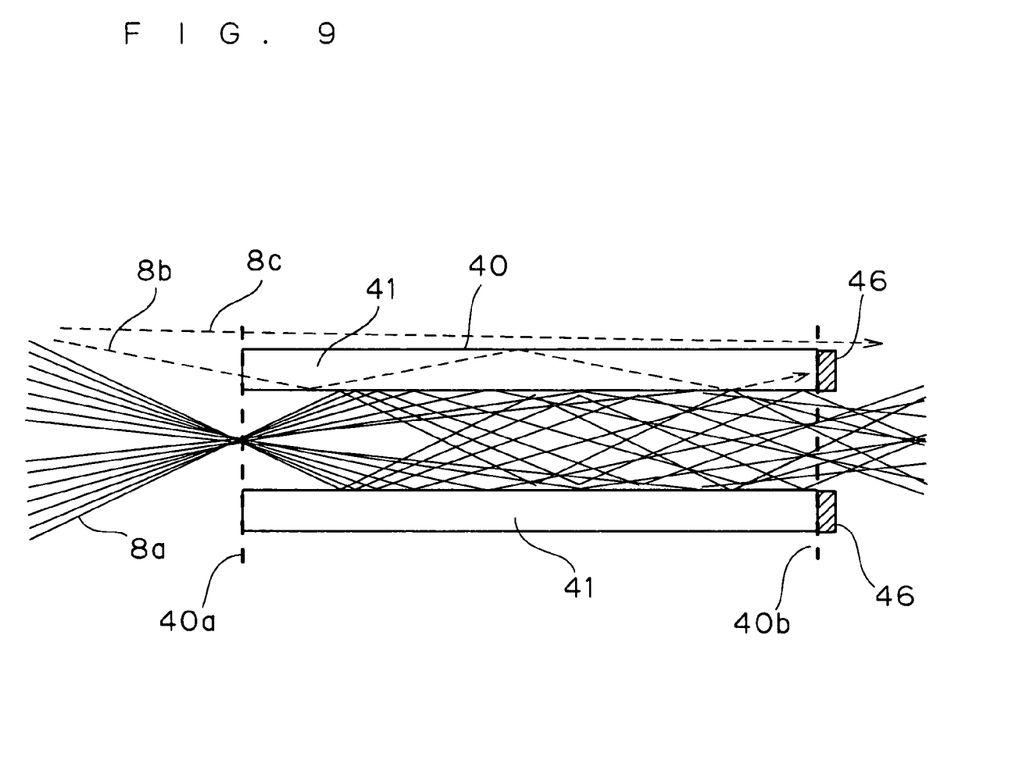
FIG. 9 illustrates another exemplary configuration of the light guiding member and light shielding member.

In a third preferred embodiment, description will be directed to an improvement of the above-described light shielding member. FIG. 9 illustrates the light guiding member 40 and a light shielding member 46 inserted into the optical path between the lamp source 10 and reflection type display device 80. The light guiding member 40 shown in FIG. 9 is the same as that described in the first preferred embodiment, and functions as a light pipe having a hollow space for guiding light formed by the plurality of glass members 41.

In the present embodiment, the light shielding member 46 is provided on the light outgoing side of the light guiding member 40 and on the end faces of the glass members 41. Such light shielding member 46 is formed by, for example, applying a light shielding coating or applying a light shielding tape on the end faces of the glass members 41.

Providing such light shielding member 46 on the end faces of the glass members 41 allows the unnecessary light ray 8b passing outside the reflection surfaces that face the hollow space of the light guiding member 40 and inside the glass members 41 to be shielded well, which can prevent the unnecessary light ray 8b from entering the post-stage optical system.

In this case, however, since the unnecessary light ray 8c may enter the post-stage optical system, it is preferable to attach a light shielding member for shielding the unnecessary light ray 8c on the end faces of the glass members 41.

Although FIG. 9 illustrates the case in which the light shielding member 46 is provided on the light outgoing side of the light guiding member 40, the light shielding member 46 may be provided on the light entering side or both on the light entering side and light outgoing side.

As described, in the present embodiment, the light shielding member 46 provided on the end faces of the members (i.e., glass members 41) forming the light guiding member 40 of rectangular pipe can shield the unnecessary light ray 8b passing outside the reflection surfaces that face the hollow space of the light guiding member 40, which can prevent the unnecessary light ray 8b from reaching the reflection type display device 80. This can prevent the whitening phenomenon caused by the unnecessary light ray 8b, allowing video effects given to viewers to be further improved.

Further, the whitening phenomenon caused by the unnecessary light ray 8b can be prevented only by placing the light guiding member 40 having the light shielding member 46 on the end faces of the glass members 41, in the light path. Moreover, the optical system 1 can be reduced in size and cost reduction can be achieved as compared to the case of providing a light shielding member independently.

Variant

Although some preferred embodiments related to the present invention have been described, the present invention is not limited to the above description.

For instance, the above preferred embodiments have been directed to, by way of example, the case where the image display region 81 of the reflection type display device 80 is formed to have an aspect ratio of 4:3 and the light outgoing surface 40b of the light guiding member 40 is formed to have an aspect ratio of 16:9, however, this is only an illustrative example, and the present invention is not limited as such.

While the invention has been shown and described in detail, the foregoing description is in all aspects illustrative and not restrictive. It is therefore understood that numerous modifications and variations can be devised without departing from the scope of the invention.

What is claimed is:

1. An optical system configured to guide light emitted from a lamp source to an image display region of a reflection-type display device along a predetermined optical path, to use said image display region of said reflection type display device to modulate and reflect a light component, and to project the modulated and reflected light component onto a predetermined screen, thereby forming an image, wherein
    only one light guiding member for reflecting therein light entering through a light entering surface several times to cause light having a uniform illumination distribution to outgo from a light outgoing surface is inserted into an optical path between said lamp source and said reflection type display device, and
    said light outgoing surface of said only one light guiding member is formed in a dissimilar shape with said image display region of said reflection type display device, and only a portion of said image display region is irradiated with light.

2. The optical system according to claim 1, wherein
    said only one light guiding member is a rectangular tube member having a reflection surface on an inner surface thereof that faces a hollow space,
    said optical system comprising a light shielding member for shielding light passing outside said reflection surface.

3. The optical system according to claim 2, wherein
    said light shielding member is a light shielding plate provided independently of said only one light guiding member.

4. The optical system according to claim 2, wherein
    said light shielding member is provided on an end face of said rectangular tube member.

5. A projection type image display apparatus configured to guide light emitted from a lamp source to an image display region of a reflection type display device along a predetermined optical path, to use said image display region of said reflection type display device to modulate and reflect a light component, and to project the modulated and reflected light component onto a predetermined screen, thereby forming an image, wherein
    only one light guiding member for reflecting therein light entering through a light entering surface several times to cause light having a uniform illumination distribution to outgo from a light outgoing surface is inserted into an optical path between said lamp source and said reflection type display device, and
    said light outgoing surface of said only one light guiding member is formed in a dissimilar shape with said image display region of said reflection type display device, and only a portion of said image display region is irradiated with light.

6. The projection type image display apparatus according to claim 5, wherein
    said only one light guiding member is a rectangular tube member having a reflection surface on an inner surface thereof that faces a hollow space,
    said projection type image display apparatus comprising a light shielding member for shielding light passing outside said reflection surface.

7. The projection type image display apparatus according to claim 6, wherein
    said light shielding member is a light shielding plate provided independently of said only one light guiding member.

8. The projection type image display apparatus according to claim 6, wherein said light shielding member is provided on an end face of said rectangular tube member.

9. The projection type image display apparatus according to claim 5, wherein the dissimilar shape of said light outgoing surface comprises an aspect ratio which is different from the aspect ratio of said image display region.

10. An optical system configured to guide light emitted from a lamp source to an image display region of a reflection-type display device along a predetermined optical path, to use said image display region of said reflection type display device to modulate and reflect a light component, and to project the modulated and reflected light component onto a predetermined screen, thereby forming an image, wherein
    only one light guiding member for reflecting therein light entering through a light entering surface several times to cause light having a uniform illumination distribution to outgo from a light outgoing surface is inserted into an optical path between said lamp source and said reflection type display device, and
    said light outgoing surface of said only one light guiding member is formed in a dissimilar shape with said image display region of said reflection type display device, and a region irradiated with light in said image display region is smaller than said image display region, wherein the dissimilar shape of said light outgoing surface comprises an aspect ratio which is different from the aspect ratio of said image display region.

11. An optical system comprising:
only one light guiding member including an internal reflective surface and a light outgoing surface, the only one light guiding member being configured to receive light and use the internal reflective surface to repeatedly reflect the light, thereby causing the light to have a substantially uniform illumination distribution as the light is discharged from the light outgoing surface, at least part of the discharged light being transmitted along an optical path; and
a reflection type display device positioned along the optical path, the reflection type display device including an image display region configured to modulate and reflect the at least part of the discharged light, thereby projecting modulated light onto a screen, wherein
the at least part of the discharged light, which is transmitted to the reflection type display device via the optical path, is irradiated on only a portion of the image display region,
wherein the light outgoing surface has a different shape than the image display region, thereby causing the discharged light, which is transmitted to the reflection type display device, to be irradiated on only a portion of the image display region.

12. The optical system according to claim 11, further comprising:
a light source, from which light enters an opening on a light entering surface of the only one light guiding member; and
a light shielding member configured to shield light from the light source, which does not enter the only one light guiding member through the opening on the light entering surface.

13. The optical system according to claim 12, wherein the light shielding member is positioned along the optical path between the light outgoing surface and the reflection type display device.

14. The optical system according to claim 12, wherein the light shielding member is positioned between the lamp source and the light entering surface.

15. The optical system according to claim 12, wherein the light shielding member is a light shielding plate having a center opening with substantially the same shape and optical axis as the light outgoing surface.

16. The optical system according to claim 15, wherein the light shielding member is independently adjustable in relation to the only one light guiding member.

17. The optical system according to claim 12, wherein the light shielding member is a light shielding substance applied to an end face of the only one light guiding member.

18. The optical system according to claim 17, wherein
the light shielding substance is applied to an end face of the only one light guiding member facing the optical path, the light shielding substance being applied to an outer region of the end face, and
the light outgoing surface comprises a region of the end face not shielded by the light shielding substance.

19. The optical system according to claim 17, wherein
the light shielding substance is applied to an end face of the only one light guiding member facing the light source, and
the opening on the light entering surface comprises a region of the end face not shielded by the light shielding substance.

20. The optical system according to claim 11, wherein said only one light guiding member is configured as a rectangular tube, each side of the rectangular tube having a reflective inner surface facing a hollow of the rectangular tube.

21. The optical system according to claim 11, wherein said only one light guiding member is configured as a rod lens.

22. The optical system according to claim 11, wherein the light outgoing surface of the only one light guiding member has a different aspect ratio than the image display region.

* * * * *